United States Patent Office 3,425,429
Patented Feb. 4, 1969

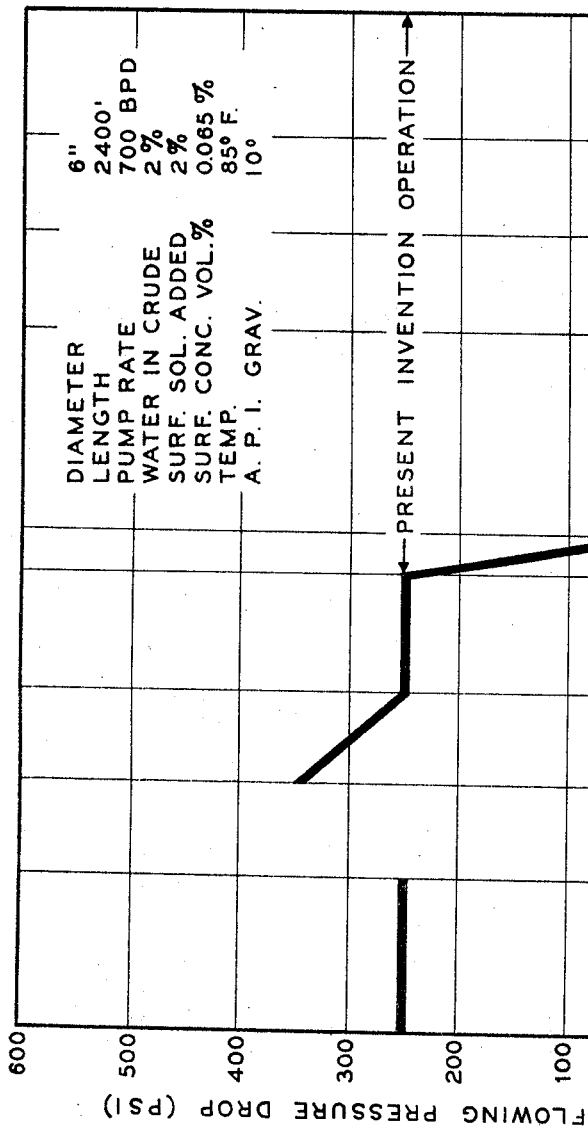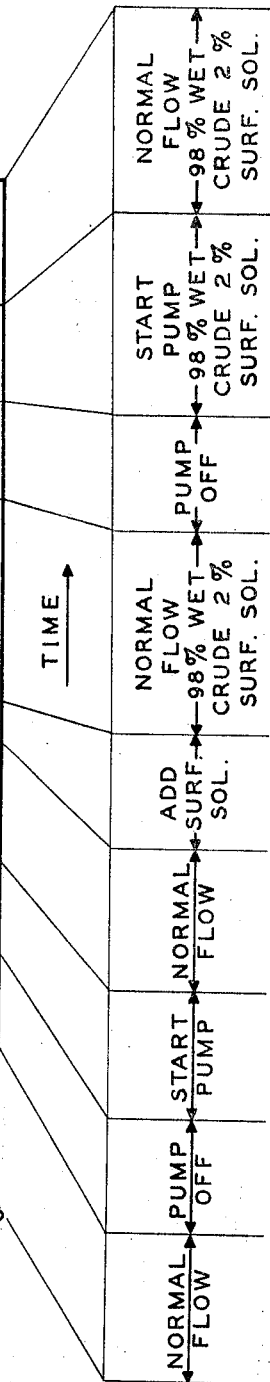
FIG. 2

3,425,429
METHOD OF MOVING VISCOUS CRUDE OIL THROUGH A PIPELINE
Arthur V. Kane, Maracaibo, Zulia, Venezuela, assignor to Chevron Research Company, San Francisco, Calif., a corporation of Delaware
Filed Jan. 11, 1967, Ser. No. 608,687
U.S. Cl. 137—13    6 Claims
Int. Cl. F17d 1/16; B67d 5/60

ABSTRACT OF THE DISCLOSURE

A method of transporting crude oil through a pipeline by injecting an aqueous solution of nonionic surfactant into the pipeline to contact the crude oil and to effect a flowing pressure drop decrease in the pipeline and thereafter reducing the amount of surfactant solution being injected into the pipeline to less than 5 percent of the crude oil concurrently injected into the pipeline to maintain the flowing pressure drop decrease.

---

Figure 1:
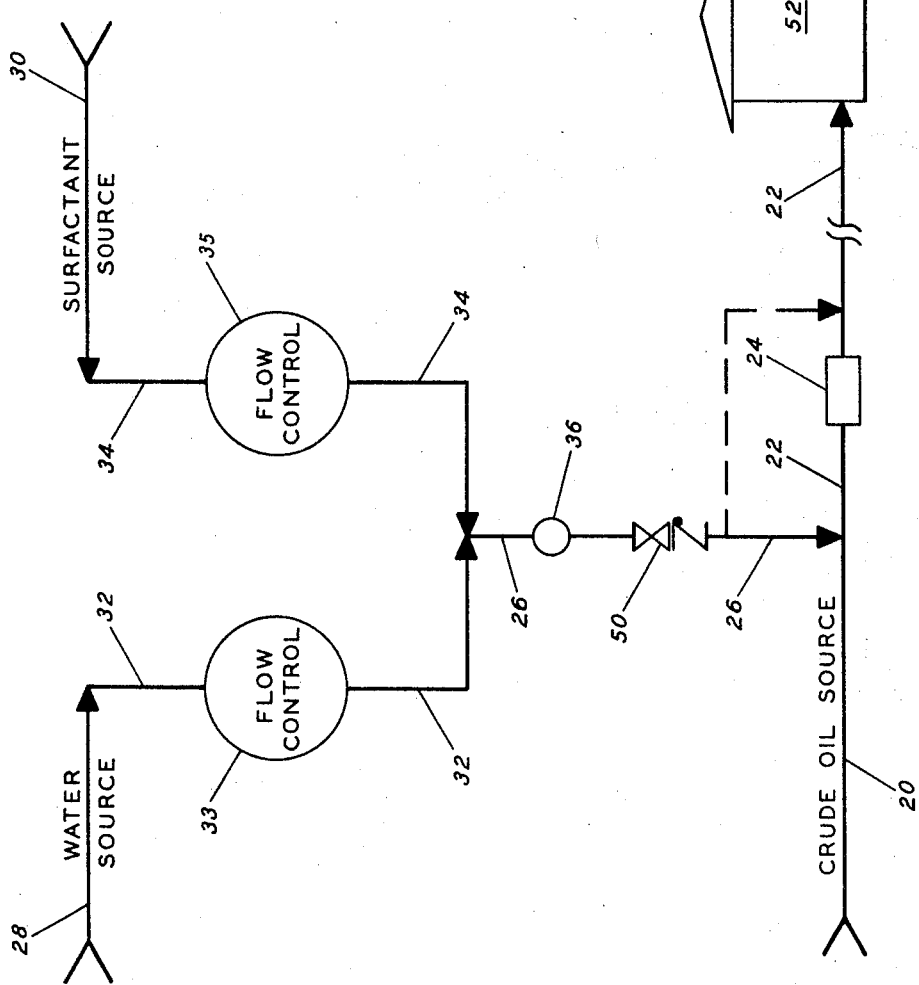

This invention relates to a process for transporting viscous crude oils; and, more particularly, this invention relates to a process of transporting viscous crude oils by initially forming an oil-in-water emulsion in a pipeline and then reducing the amount of water added to the oil in the pipeline to an amount less than required for forming an oil-in-water emulsion but in an amount sufficient to coat the walls of the pipeline through which the oil is passing.

It has been found heretofore that the apparent viscosity of crude oil can be greatly reduced by forming an oil-in-water emulsion of the crude. In one process, for example as discussed in copending U.S. application Ser. No. 599,125, an oil-in-water emulsion is formed by mixing a crude and an aqueous, nonionic surfactant solution. In order to obtain an oil-in-water emulsion, it has been found that the water content must be at least about 10 to 15 percent and, in some cases, 20 to 25 percent of the total oil/water combination. Attempt to create low-viscosity, oil-in-water emulsions when the water content of the mixtures is less than about 10 to 15 percent has heretofore resulted in the formation of inverted—i.e., water-in-oil—emulsions. Inverted emulsions are extremely undesirable in pipeline operations because the viscosity of water-in-oil emulsions generally in higher than the viscosity of the oil alone.

In accordance with the present invention, an oil-in-water emulsion is formed by mixing oil and an aqueous, non-ionic surfactant solution; and the resulting emulsion is moved in a pipeline. The initial ratio of oil to water may be any desirable ratio that will give an oil-in-water emulsion. It is highly desirable, however, to initially form an oil-in-water emulsion having an oil content of at least 75 percent. As indicated heretofore, the initial upper range of oil concentrations with which a suitable oil-in-water emulsion can be formed for pipelining is about 85 to 90 percent oil. In all events, the initial upper limit of oil concentration is established by that oil concentration with which a continuous water phase may be present.

The water with which the initial oil-in-water emulsion is formed contains an amounts of nonionic surfactant sufficient to form a suitable oil-in-water emulsion. It is desirable that the initial water contain at least about .05 and preferably at least about .1 vol. percent nonionic surfactant based on the water content. The oil and water are brought together in the proper ratio in a suitable environment. It is preferred that the oil and water are mixed together in a pipeline with minimum turbulence. The water may be added to a pipeline in which the oil is already being moved. As water containing the surfactant is pumped into the pipeline, an oil-in-water emulsion will be formed. After the formation of the oil-in-water emulsion, the pressure drop in the pipe will decrease considerably. Then, in accordance with the present invention, the amount of water can be greatly reduced. The water is cut back to a small proportion of the initial starting water. The amount of water can be decreased to an amount needed to maintain a thin film of water on the inside of the pipeline. For example, it has been that water may be reduced to as low as 2 percent of the oil flowing in the line while still maintaining desirable flow conditions in the pipeline. In a similar manner, it has been found that the concentration of surfactant may also be reduced to a low value and at times discontinued completely. Thus the method of the present invention permits moving a viscous oil through a pipeline with only a fraction of the pressure drop heretofore encountered and with only a fraction of the water heretofore thought necessary to maintain the low resistance to flow.

It is a particularly object of the present invention to provide a method for transporting a viscous oil through a pipeline by initially forming an oil-in-water emulsion with the oil in the pipeline and then reducing the amount of water added to the oil in the pipeline to an amount which is required to maintain an aqueous film on the wall of the pipeline to retain a reduced resistance to flow in the pipeline.

Further objects and advantages of the present invention will become apparent from the following detailed description read in light of the accompanying drawings which are made a part of this specification, and in which:

FIGURE 1 is a schematic diagram illustrating the preferred embodiment of apparatus assembled for use in practicing the present invention; and FIGURE 2 is a graph showing a comparison in pipeline pressure drop between the prior art method of pipelining and the pipelining method of the present invention.

In accordance with the present invention, a supply of oil is received from a suitable source, such as stock tank 20. The oil is directed into a pipeline 22 and is moved through the pipeline by means of a pump 24. Just downstream of the oil tank 20, a second line 26 is T'd into the oil line 22. The second line 26 is used to add the aqueous surfactant solution to the oil in pipeline 22. A source of water 28 and a source of surfactant 30 are connected by suitable pipelines 32 and 34 which join together upstream of a mix meter 36 in line 26. Flow control devices indicated generally by the numerals 33 and 35 control the rate of flow of water and surfactant through lines 32 and 34 respectively so that a desired concentration of aqueous surfactant solution can be established and maintained. Any suitable well-known flow control devices may be utilized. For example, metering pumps may be used to provide suitable flow of water and surfactant. A valve 50 is provided downstream of the mix meter 36 so that the amount of aqueous surfactant solution which is metered into the oil pipeline may be closely controlled. At the downstream end of the pipeline 22, a separation tank 52 is provided with appropriate piping to take up and separate the oil and water surfactant mix. For example, oil can leave the separation tank through line 54 while the water surfactant mix is drained from the tank through line 56.

In accordance with the preferred form of the invention, oil is moved into the pipeline 22 by means of pump 24. An aqueous surfactant solution is also injected into pipeline 22 at a suitable location. The surfactant solution is injected into the oil line at a T connection, such as the one formed by pipe 26 connecting with pipeline 22. Initially the water surfactant mix is metered into the oil line in an amount suitable to form an oil-in-water emulsion in the pipeline. The surfactant solution is preferably made up of at least .05 and preferably .1 vol. percent surfactant based on injected water content. It is preferable that initially the injected aqueous surfactant solution total about 25 percent of total fluid in the pipeline. The rate of injection of the surfactant solution is adjusted so that the amount of aqueous solution entering the pipeline is initially equal to about 25 percent of the oil flowing through the pipeline in order to give a 75 percent oil, 25 percent water emulsion.

A nonionic surfactant is mixed with the water stream prior to the time water is injected into the oil. It is desirable to have at least about a 0.1 vol. percent surfactant aqueous solution in the initial phase of the invention particularly with high oil-water ratios. As the surfactant solution mixes with the oil in the pipeline, an oil-in-water emulsion is formed. The oil-in-water emulsion is much less viscous than the oil itself and is thus much more easily transported through the pipeline. After the initial oil-in-water emulsion has been established in the pipe, the amount of water being metered into the pipeline is drastically reduced. It is only required to add sufficient water to the pipeline to wet the pipe walls to maintain lubrication for the oil and to retain the reduced pressure drop in the line. Thus it has been found that as little as 2 percent water can be metered into the pipeline to retain the desirable results. The amount of surfactant being metered in with the water can also be reduced substantially. As little as .05 vol. percent surfactant based on water content is effective in promoting easy flow of the crude through the line. Since 2 percent of aqueous surfactant solution is not enough to form an oil-in-water emulsion, it is believed that the water coats the walls of the pipe and provides a sliding surface for the oil. It is necessary, however, that the pipeline first be conditioned by a slug of oil-in-water emulsion formed as described above prior to the time the water is cut back to its low percentage. The advantages of pipelining only 2 percent water in the crude oil system are obvious. For example, there is a great deal less water to transport and dispose of at the pipeline terminal and a great deal more oil moved through the pipeline for any given period of time.

In accordance with the present invention, an oil-in-water mixture is initially prepared by mixing a crude oil to a dilute aqueous surfactant solution. The upper oil limit of the mixture is determined by the minimum amount of water required to form a continuous water phase. For most oils, the upper limit is about 85 to 90 percent for pipeline stability. Thus with as little as about 10 to 15 percent water, a continuous water phase can be formed. It is critically important that the initial mixture form an oil-in-water emulsion and not a water-in-oil emulsion since the latter has very undesirable properties for use in the present invention.

An aqueous surfactant solution is mixed with the oil to form the desired mixture. As indicated, the amount of water may initially be as little as about 10 to 15 percent although it is usually preferred to start with 20 to 25 percent water and 75 to 80 percent oil. The surfactant is added to the water before the water is mixed with the oil. Nonionic surfactants are used in the present invention. Nonionic surfactants useful in the present invention are divided into five basic types by linkage. (See "Emulsion Theory and Practice," by P. Becher, ACS Monograph, No. 162, 1965, Reinhold Publishers, New York.) These five types are ether linkage, ester linkage, amide linkage, miscellaneous linkage and multiple linkage. The ether linkage, nonionic surfactants are preferred for use in the present invention. The surfactants preferred for use in the present invention are selected from the group having the general formulas:

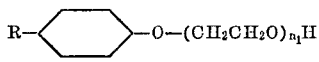

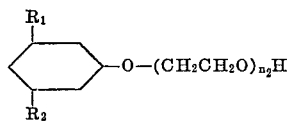

where R, $R_1$ and $R_2$ = any hydrocarbon group and $n_1$ and $n_2$ = 4 to 100.

As indicated above, other surfactants, such as the ester linkage and the amide linkage, may be used in accordance with the invention. The general formula for the ester linkage is:

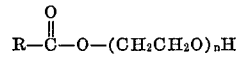

where R = a fatty acid group and $n$ = 4 to 100.

The general formula for the amide linkage surfactant is:

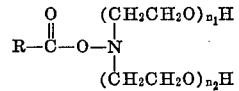

where R = any hydrocarbon group and $n_1$ and $n_2$ = 4 to 100.

The highly preferred nonionic surfactants for use in accordance with the invention are the nonylphenoxypoly (ethyleneoxy) ethanols. Superior results have been obtained with surfactants containing 10–15 miles ethylene oxide per mole of nonylphenol. These surfactants have decreasing water solubility with increasing temperature. Emulsions formed with these types of surfactants have good stability up to 160° F. and fair stability in the 160–175° F. range. At temperatures in the 200° F. range, separation of oil and water is rapid, and gravity separation can produce a low water cut oil.

The highly preferred surfactants are selected from a group having the general formulas:

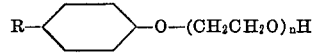

and

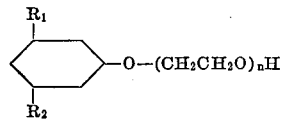

where R, $R_1$ and $R_2$ = any alkyl radical and where $n$ = 4 to 100.

A list of highly preferred surfactants is set out below:

TABLE I

| Proprietary Name | R | n |
|---|---|---|
| NIW | $C_{12}H_{25}$ | 14 |
| NIO | $C_{12}H_{25}$ | 6 |
| IGEPAL CO 430 | $C_9H_{19}$ | 4 |
| IGEPAL CO 430 | $C_9H_{19}$ | 4 |
| IGEPAL CO 530 | $C_9H_{19}$ | 6 |
| IGEPAL CA 630 | $C_8H_{17}$ | 9 |
| IGEPAL CO 710 | $C_9H_{19}$ | 10–11 |
| IGEPAL CO 730 | $C_9H_{19}$ | 15 |
| IGEPAL CO 850 | $C_9H_{19}$ | 20 |
| IGEPAL CO 887 | $C_9H_{19}$ | 30 |
| IGEPAL CO 990 | $C_9H_{19}$ | 100 |
| IGEPAL DM 710 | 2-4 dinonyl- | 10–11 |
| IGEPAL DM 970 | 2-4 dinonyl- | 50 |
| DME | (1) | |

1 Proprietary mixture, chemically similar to IGEPAL CO 887.

Suitable ester linkage surfactants, for example, include surfactants having the following general formulas:

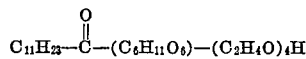

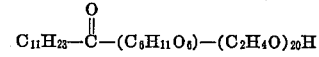

and

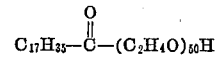

Table II sets out the results of a number of demonstrations showing various combinations of oil/water ratios, surfactants, and surfactant percentages useful in forming transportable emulsions in accordance with this invention. The results show that suitable mixtures may be formed with water containing .05 vol. percent surfactant based on added water. It is usually preferred, however, to form the mixture with at least about .1 vol. percent surfactant based on added water. The advantage that is obtained by forming the transportable mixture is readily seen in the case of Boscan crude. Typically the viscosity of pure Boscan crude is 80,000 centipoises at 70° F. However, the viscosity of an emulsion containing 75 percent Boscan and 25 percent water is only 50 centipoises at 70° F. Table II shows properties of various mixtures of Boscan crude, water and surfactants.

In Table IV, the properties of mixtures prepared with the California crude nominated A, B and C with aqueous solutions containing IGEPAL CO 850 are shown. As indicated in the table, the mixture is prepared with both fresh and produced waters. Suitable mixtures were formed with 0.04 vol. percent surfactant.

As is evident from the data presented in Tables II, III and IV, a tremendous improvement in viscosity can be obtained by forming oil and water mixtures of the viscous crudes in accordance with the present invention. As indicated above, the upper initial oil/water ratio is limited by the amount of water needed to produce a suitable oil-in-water emulsion for pipelining transportation. The upper limit for oil in most surfactant and crude oil mixtures is between about 85 to 90 percent. Thus the minimum amount of water that can be used initially in ac-

TABLE II

| Sample No. | Oil/Water Ratio | Chemical Name | Vol. percent in Water | Mixture Viscosity °F. | Mixture Viscosity Cp. | Water Remaining in Oil Separated at 200° F., Percent |
|---|---|---|---|---|---|---|
| 1 | 75/25 | CO 710 | 0.10 | 117 | 93 | 11.7 |
| 2 | 75/25 | CO 710 | 0.10 | 112 | 78 | 2.0 |
| 3 | 75/25 | CA 630 | 0.10 | 116 | 55 | 10.8 |
| 4 | 75/25 | CA 630 | 0.10 | 108 | 67 | 2.0 |
| 5 | 75/25 | DM 970 | 0.10 | 121 | 60 | 12.5 |
| 6 | 75/25 | DM 970 | 0.10 | 108 | 69 | 2.4 |
| 7 | 75/25 | DME | 0.10 | 109 | 91 | 10.5 |
| 8 | 75/25 | DME | 0.10 | 104 | 100 | 3.9 |
| 9 | 75/25 | NIW | 0.10 | 120 | 59 | |
| 10 | 75/25 | NIW | 0.10 | 122 | 56 | 10.6 |
| 11 | 75/25 | NIW | 0.10 | 116 | 46 | 2.1 |
| 12 | 80/20 | NIW | 0.10 | 127 | 49 | |
| 13 | 80/20 | NIW | 0.10 | 120 | 48 | 10.0 |
| 14 | 75/25 | NIW | 0.05 | 118 | 11 | |
| 15 | 75/25 | NIW | 0.05 | 120 | 43 | 10.3 |
| 16 | 80/20 | NIW | 0.05 | 123 | 26 | 11.0 |
| 17 | 85/15 | NIW | 0.05 | | | |
| 18 | 80/20 | CO 710 | 0.10 | 123 | 97 | 10.2 |
| 19 | 75/25 | CO 730 | 0.10 | 115 | 92 | 8.6 |
| 20 | 80/20 | CO 730 | 0.10 | 116 | 147 | 8.0 |
| 21 | 75/25 | CO 850 | 0.10 | 110 | 142 | 11.9 |
| 22 | 80/20 | CO 850 | 0.10 | 111 | 187 | 12.0 |
| 23 | 75/25 | CO 887 | 0.10 | 112 | 102 | 12.0 |
| 24 | 80/20 | CO 887 | 0.10 | 117 | 188 | 11.0 |
| 25 | 75/25 | CO 436 | 0.10 | 103 | 104 | 8.7 |
| 26 | 80/20 | CO 436 | 0.10 | 117 | 149 | 11.6 |
| 27 | 80/20 | CA 630 | 0.10 | 110 | 48 | 8.0 |
| 28 | 75/25 | DM 710 | 0.10 | 120 | 64 | 9.0 |
| 29 | 80/20 | DM 710 | 0.10 | 120 | 55 | 10.5 |
| 30 | 80/20 | DM 970 | 0.10 | 116 | 93 | 9.7 |
| 31 | 80/20 | DME | 0.10 | 114 | 159 | 11.0 |
| 32 | 75/25 | NIW | 0.15 | 116 | 68 | 11.0 |
| 33 | 75/25 | NIW | 0.20 | 117 | 72 | 15.0 |
| 34 | 75/25 | Visco-1111 | 0.20 | 114 | 45 | |
| 35 | 75/25 | do | 0.30 | 106 | 81 | |
| 36 | 75/25 | Visco-1111 / NIW | 0.05 / 0.05 | 108 | 45 | |
| 37 | 75/25 | Visco-1111 / CO 730 | 0.05 / 0.05 | 110 | 95 | |
| 38 | 75/25 | Visco-1111 / CO 850 | 0.05 / 0.05 | 114 | 89 | |

Suitable oil-in-water mixtures have been formed with a number of other crude oils. Table III sets out the properties of mixtures prepared with California crude oils utilizing fresh water and various surfactants. The California crude oils are namely indicated as A, B and C. The A crude has an API gravity of 12.17 and a viscosity of 14,000 centipoises at 70° F. The B crude has an API gravity of 12.17 and a viscosity of 19,000 centipoises at 70° F. The C crude has an API gravity of 10.15 and a viscosity of 70,000 centipoises at 70° F.

TABLE III

| Crude Oil | Oil/Water Ratio | Chemical | Chemical Concentration in Water, Volume percent | Emulsion Viscosity Temperature, °F. | Emulsion Viscosity Viscosity, cp. |
|---|---|---|---|---|---|
| B | 75/25 | NIW | 0.10 | 98 | 20 |
| B | 75/25 | CO 850 | 0.10 | 99 | 75 |
| B | 75/25 | DM 710 | 0.10 | 97 | 24 |
| A | 75/25 | NIW | 0.10 | | |
| A | 75/25 | CO 850 | 0.10 | 117 | 17 |
| A | 75/25 | DM 710 | 0.10 | 98 | 20 |
| C | 75/25 | NIW | 0.10 | | |
| C | 75/25 | CO 850 | 0.10 | 100 | 25 |
| C | 75/25 | DM 710 | 0.10 | | |

TABLE IV

| Crude Oil | Oil/Water Ratio | Water | Chemical Concentration in Water, Volume percent | Emulsion Viscosity Temperature, °F. | Emulsion Viscosity Viscosity, cp. |
|---|---|---|---|---|---|
| B | 75/25 | Produced | 0.10 | 96 | 97 |
| A | 75/25 | do | 0.10 | 100 | 13 |
| C | 75/25 | do | 0.10 | | |
| A | 75/25 | Fresh | 0.10 | 110 | 19 |
| A | 75/25 | do | 0.08 | 100 | 15 |
| A | 75/25 | do | 0.06 | 84 | 35 |
| A | 75/25 | do | 0.04 | 100 | 12 |
| A | 75/25 | do | 0.02 | | |
| A | 75/25 | do | 0.01 | | |
| A | 75/25 | Produced | 0.10 | 94 | 14 |
| A | 75/25 | do | 0.08 | 93 | 9 |
| A | 75/25 | do | 0.04 | 97 | 11 |
| A | 75/25 | Fresh | 0.06 | 82 | 23 | cordance with the present invention usually is between 10 and 15 percent. After low pressure drop flow has occurred, then the water may be reduced to only an amount required to maintain the walls of the pipeline water wet. Table V below shows the effect of gradually decreasing the water content in the aqueous surfactant mixture. The crude oil used in Table V was a California crude type A oil maintained at 140° F. The 0.1 vol. percent IGEPAL CO 850 in tap water at 72° F. formed the aqueous solution. It is apparent that oil-in-water emulsions were formed at the 75/25 to the 85/15 mixtures because the mixtures were water wet and had electrical conductivity.

TABLE V

| O/W | Water Wet Glass Wall | Elect. Conductivity | Dispersed in | |
|---|---|---|---|---|
| | | | Water | Toluene |
| 75/25 | Yes | Yes | Yes | No. |
| 80/20 | Yes | Yes | Yes | No. |
| 85/15 | Yes | Yes | Slow | Slow. |
| 90/10 | No | No | Very slow | Do. |
| 95/5 | No | No | do | Do. |

Table VI below shows the effect of varying the oil/water ratio in mixtures of California crude oil D. The D crude was at a temperature of 110° F. and was mixed with an aqueous surfactant solution formed of 0.1 vol. percent DM 970 at 72° F.

TABLE VI

| O/W | Water Wet Glass Wall | Elect. Conductivity | Dispersed in | |
|---|---|---|---|---|
| | | | Water | Toluene |
| 75/25 | Yes | Yes | Yes | No. |
| 80/20 | Yes | Yes | Yes | No. |
| 85/15 | Yes | Yes | Yes | No. |
| 90/10 | Yes | Yes | Yes | No. |
| 95/5 | No | No | No | Yes. |

The data given in Tables V and VI indicate that the upper initial limit for oil in most aqueous solution, crude oil mixtures is between about 85 to 90 percent in order to form a suitable mixture for pipeline transportation. After low pressure drop flow is initially established, then the amount of water can be reduced to a very low value as stated above. It is apparent, however, from the data that initially the amount of water must be great enough to establish an oil-in-water emulsion.

It has been found that the water with which the mixtures of the present invention are formed is not limited to distilled or potable water. The nonionic surfactants are not affected by salts in solution in the water; and, therefore, formation water, and even seawater, can be used in forming the mixtures in accordance with the present invention. This is a particularly desirable feature in field operations since it may not be economical to obtain large quantities of relatively fresh water for use in the process. Table VII sets out the properties of a Boscan crude, aqueous surfactant mixture when the water utilized was 100 percent seawater. Two emulsions were prepared with different surfactants and with seawater obtained directly from the ocean at Huntington Beach, Calif.

TABLE VII

| | A | B |
|---|---|---|
| O/W Ratio | 75/25 | 75/25. |
| Oil Temperature, °F | 140 | 95. |
| Seawater Temperature, °F | 50 | 41. |
| Surfactant | CO 730 | Visco IIII. |
| Surfactant Concentration in Seawater, Volume Percent | 0.1 | 0.1. |
| Dispersed in Water | Yes | Yes. |
| Conducted Electricity | Yes | Yes. |
| Emulsion Viscosity | 183 cp. at 98° F. | Under 200. |
| Separation After Standing at 200° F. For One Hour, Volume Percent Water Remaining in Crude. | 3.8 | |

The initial emulsions of the present invention are preferably prepared by mixing a dilute aqueous surfactant solution with a crude. The aqueous surfactant is preferably mixed with the crude in a pipeline in the desired ratio. The surfactant solution is best added to the oil in the pipeline by means of a T-connection either upstream or downstream of the pump. The mixing of the streams causes an oil-in-water emulsion to be readily formed. The amount of water and surfactant can be greatly reduced when a pressure drop decrease is noted in the pipeline.

After the emulsion is initially prepared in the pipeline as described above, a decrease in pressure drop will occur in the line. FIGURE 2 illustrates the pressure drop conditions in a pipeline under prior art operation and under the method of the present invention. The rapid fall-off in pressure after the oil/water emulsion has been formed as taught above is the signal to reduce the injected water content to a value sufficient to maintain the pipe walls wetted. The injected water surfactant solution may be cut to 2 percent of the total fluid in the pipeline.

A separation tank is provided at the downstream end of the pipeline to separate oil and water. It has been found that the water surfactant mix can be separated from the oil with a reasonable degree of separation in a separation tank where a temperature is maintained at about 120 to 140° F. For some oil and aqueous surfactant mixes, it is desirable that the temperature be somewhat higher—such as, for example, on the order of 180° F.

In a particular application of the method of the present invention, a Boscan type crude was pumped through a 6-inch, 2400-foot line by means of a Worthington duplex 4½-inch by 10-inch pump. The surfactant used in the demonstration was Visco 1111. Visco 1111 is a proprietary product of Nalco and is a blend of nonionic, nonylphenoxypoly (ethyleneoxy) ethanol surfactants having a general formula:

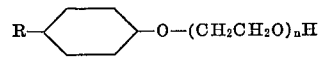

where R is an alkyl radical and where $n$ equals the moles of ethylene oxide.

Initially, the oil-in-water ratio in the pipeline was established and maintained at 75/25 with the Visco 1111 at 0.1 percent of the volume of water. The temperature of the Boscan crude should be less than about 175° F. When the aqueous surfactant solution was added to the oil in the pipeline, an oil-in-water emulsion was formed and the flowing pressure drop decreased. In accordance with the invention, when the discharge line pressure decreased, the water rate was gradually cut back about 2

TABLE VIII

| | Normal Crude Pumping | Pumping w/water and Visco 1111 | Normal Crude Pumping | Pumping w/water and Visco 1111 |
|---|---|---|---|---|
| Pumping Rate b.p.d | 700 | 700 | 2,400 | 2,400 |
| Discharge Pressure p.s.i | 450 | 210 | 1,000 | 240 |
| Total Line Loss p.s.i | 250 | 10 | 800 | 40 |
| Max. Start-Up Pressure Observed p.s.i. | 550 | 250 | 1,200 | 450 |
| Avg. Required Start-Up Pressure p.s.i. | 350 | 50 | 1,000 | 250 |
| Temperature °F | 85 | 85 | 85 | 85 |
| Total Water, Percent | 2 | 4 | 2 | 4 |
| Vol. Percent Visco 1111 in Water | | 0.065 | | | percent while the surfactant content was reduced to .065 percent. The friction losses were minimized as can be observed from Table VIII above.

After the reduced friction flow is established in the pipeline and the water reduced to about 2 percent of the total fluid, the line may be shut down and flow reestablished with a very reasonable start-up pressure. These data are also evident from Table VIII and from FIGURE 2. It is noted that the particular Boscan crude used had a 2 percent water cut. This water was in the crude prior to mixing with the aqueous surfactant solution, and it is believed that the surfactant solution did not mix with the native water in the crude. As noted above the surfactant solution is believed to coat the interior wall of the pipeline and allow the oil to slide through the pipeline with greatly reduced resistance to flow. Thus after the pipeline has been treated the surfactant solution that is injected into the pipeline may be greatly reduced. In one instance after low pressure drop flow was established in accordnace with the present invention, the injection of surfactant solution into the pipeline wsa completely terminated for a two-day period and the improved flow conditions were retained during this period. At the end of the period water containing surfactant was again injected in small amounts into the pipeline. Thus it is in accordance with the invention to interspace oil and surfactant solution mixtures in a pipeline to establish low viscosity flow and then to move crude in the pipeline without injection of surfactant solution for a period of time. Thus where it is desirable to receive native crude without extraneous water a slug process is feasible wherein surfactant solution is periodically slugged into a pipeline into which native crude is being injected during the major period of time. The relatively small amounts of oil/surfactant solution mixture can be segregated at the pipeline terminal for special treatment if needed while the interspaced straight native crude can be treated normally.

Although only a few embodiments of the present invention have been described, the invention is not meant to be limited to only these embodiments but rather by the scope of the appended claims.

I claim:

1. A method of transporting crude oil through a pipeline comprising injecting into a pipeline an aqueous solution of nonionic surfactant, the concentration of said surfactant in said solution being at least enough to cause crude oil to emulsify in said solution, moving oil into said pipeline and into contact with at least a portion of said solution to effect a flowing pressure drop decrease in said pipeline, thereafter reducing the amount of surtactant solution being injected into said pipeline to an amount of less than 5 percent of the crude oil being concurrently injected into said pipeline to maintain the flowing pressure drop decrease in said pipeline at a low value and moving oil and surfactant solution through said pipeline.

2. The method of claim 1 further characterized in that the temperature of the crude is less than 175° F. when the crude is initially contacted with surfactant solution.

3. The method of claim 1 where the surfactant solution contains about .1 percent by volume of nonionic surfactant.

4. The method of claim 1 where the amount of surfactant solution being injected is reduced to about 2 percent of the crude oil being concurrently injected into said pipeline.

5. The method of claim 1 where surfactant solution is injected into said pipeline to initially establish said flowing pressure drop decrease and then said injection is stopped while straight native crude is continued to be pumped through said pipeline while said pressure drop in said pipeline is at said low value.

6. The method of claim 1 further characterized in that the amount of surfactant is reduced to about .065 percent by volume based on added water.

References Cited

UNITED STATES PATENTS

| | | | |
|---|---|---|---|
| 2,821,205 | 1/1958 | Chilton et al. | 137—13 |
| 3,006,354 | 10/1961 | Sommer et al. | 137—13 |
| 3,307,567 | 3/1967 | Goganty et al. | 137—13 |

FOREIGN PATENTS

| | | |
|---|---|---|
| 625,980 | 8/1961 | Canada. |

WILLIAM S. BURDEN, *Primary Examiner.*